Dec. 29, 1953

J. H. WIENS 2,664,520

COLOR TELEVISION RECEIVING SYSTEM

Filed Feb. 4, 1952

INVENTOR.
Jacob H Wiens
BY
Flehr & Swain
ATTORNEYS

Patented Dec. 29, 1953

2,664,520

UNITED STATES PATENT OFFICE 2,664,520

COLOR TELEVISION RECEIVING SYSTEM

Jacob H. Wiens, Redwood City, Calif.

Application February 4, 1952, Serial No. 269,836

2 Claims. (Cl. 315—10)

This invention relates generally to television systems for receiving images in color, as distinguished from black and white.

One form of color television system has been proposed which makes use of a cathode ray tube having a screen provided with phosphors of different color characteristics arranged in closely adjacent parallel lines (see Electronics, page 89, December 1951). The phosphors can be such as to provide crimson, green and violet colors, and the scanning is such that the beam tracks the color lines in a suitable sequence. One disadvantage of such a system is that it is difficult to maintain accurate tracking of the color lines. This difficulty is due in part because the lines must be relatively narrow, and in addition because the electronic circuits employed for tracking the beam are such that a high degree of accuracy is difficult if not impossible. It will be evident that without high accuracy such a system will provide an image which is distorted and lacking in color fidelity, or the system may be completely inoperative to provide reconginzable image reproduction.

It is an object of the present invention to provide a system of the above character which will make possible automatic and accurate tracking of the beam upon the parallel phosphor lines of the screen.

Another object of the invention is to provide a system of the above character having means serving to automatically correct any tendency of the system toward inaccurate tracking.

Additional objects and features of the invention will appear from the following description in which the preferred embodiment of my invention has been set forth in detail in conjunction with the accompanying drawing.

Referring to the drawing—

Figure 1:
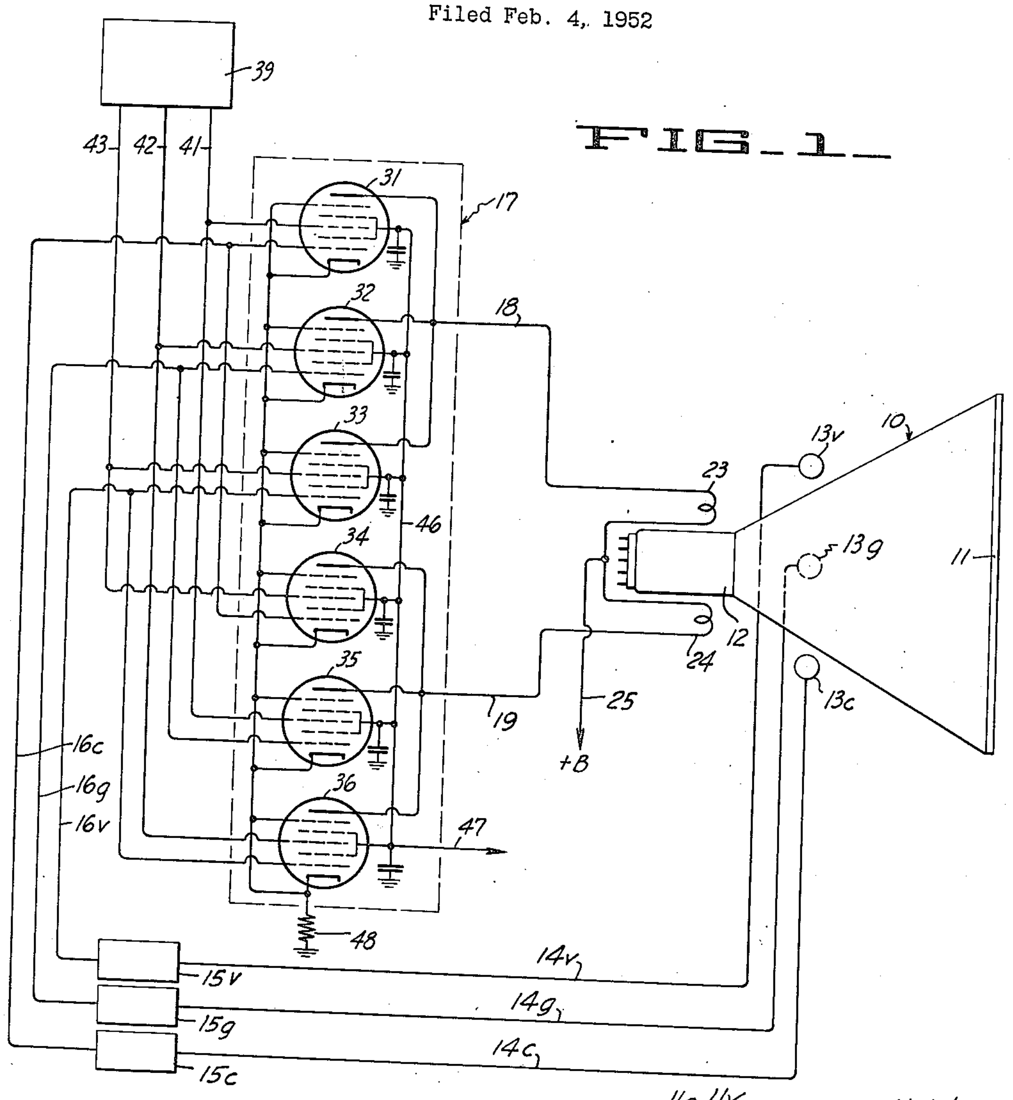
Figure 1 is a circuit diagram illustrating a system incorporating my invention.

The system of the present invention, as schematically illustrated in the drawing, consists of a cathode ray tube 10 which is provided with an image screen 11. The means for producing, focusing and deflecting the cathode ray beam are housed within the neck 12, and for a tube of the magnetic type may include a cathode and its heater, magnetic beam focusing means, a control grid, and coils for deflecting the beam in horizontal and vertical directions. For a tube of the electrostatic type, electrostatic electrodes are employed for deflecting the beam in horizontal and vertical directions.

Figure 2:
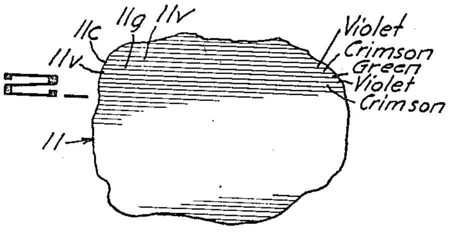
Figure 2 is an enlarged detail showing a portion of the image screen.

Instead of using an image screen 11 of conventional type, having a single phosphor (or a homogeneous mixture) applied over its entire area, I employ a screen made by applying phosphors of different colors in closely adjacent bands or lines. Such an arrangement is schematically shown in enlarged Figure 2. Thus the bands or lines 11c, 11g and 11v are formed by phosphors capable of providing crimson, green and violet colors. These lines are located relatively close to each other, and are sufficiently narrow to provide the desired lines per inch. By way of example, such lines can be sufficiently narrow to provide 100 lines per inch of screen.

The horizontal deflecting coils of the tube are connected to a sweep generator (not shown) which is capable of sweeping the beam horizontally at the desired rate. The vertical deflecting coils normally provided in such tubes are connected to a circuit which provides deflecting voltages of such value that the beam sweeps successively over the phosphor lines of different color and in a selected sequence. The order with which the phosphor lines are swept by the beam is such as to form resulting image forming light which is crimson, green and violet, whereby such image forming light is merged by the observer into an image of natural color.

The system described above is of the type disclosed in the above mentioned publication. The performance of such a system is dependent upon the accuracy with which the beam can be caused to successively track the narrow phosphor lines. In accordance with my invention I provide means which serves to correct any inaccuracy in tracking. A characteristic of the present invention is that I employ photoelectric means responsive to light from the phosphor lines which are immediately above and below the line being scanned, and the response from the photoelectric means is employed to automatically effect the desired correction.

The photoelectric means which I employ can be in the form of three photoelectric tubes 13c, 13g and 13v. These tubes may be either within or exterior to the cathode ray tube, but they are arranged to be responsive to a light of certain color characteristics from the screen. Thus these tubes are associated with color filters or like means whereby tube 13c is predominantly responsive to crimson light, tube 13g predominantly responsive to green light, and 13v to violet light.

Lines 14c, 14g and 14v schematically represent circuit connections from the photoelectric tubes to the inputs of the individual amplifiers 15c, 15g and 15v. The voltages developed by the outputs of these amplifiers are shown being applied by lines 16c, 16g and 16v, to the electronic switching network 17. Lines 18 and 19 represent the output from the electronic switching network and connect with the coils 23 and 24. A connection between these coils is connected by conductor 25 to a suitable source of voltage for the plates of the switching tubes. If desired coils can be supplied with current from suitable electronic amplifying means, having its input coupled to the plate circuit of the electronic switching means.

The adjustment can be such that when there is an equal current flow through each of the coils 23 and 24, the net result of the coils 23 and 24 have no effect upon the beam. When the current to coil 23 exceeds the current supplied to coil 24 the beam will be depressed. Similarly when the current supplied to coil 24 exceeds the current supplied to coil 23 the beam is elevated.

The electronic switching means 17 is such that at any one instant two of the photoelectric tubes are effectively connected to control current flow through coils 23 and 24. The third photoelectric tube however is effectively disconnected and this tube is the one which is responsive to the color produced by the phosphor line being scanned.

The particular electronic switching network illustrated consists of tubes 31, 32, 33, 34, 35 and 36, which can be of the pentagrid type. Each one of these tubes is arranged to operate as an electronic switching gate. The anodes of the tubes 31, 32 and 33 are connected together and to the line 18.

Figure 3:
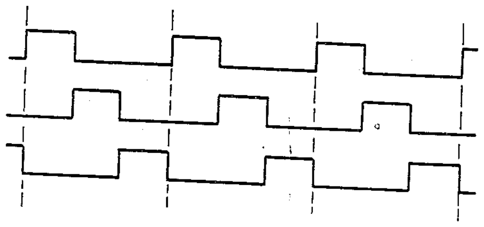
Figure 3 shows wave form curves for the pulse generator.

The anodes of the tubes 34, 35 and 36 are also connected together and to line 19. A pulse (e. g. square wave form) generator 39 is connected to the electronic switching network by lines 41, 42 and 43, and serves to supply switching pulses. These pulses may have a wave form and phase relationship as indicated by the curves of Figure 3. Line 41 is connected to a grid of each of the tubes 31 and 35, whereby when a positive voltage pulse is applied to line 41, tubes 31 and 35 are rendered conductive. Line 42 is connected to corresponding grids of the tubes 32 and 36, whereby when a pulse is applied to this line the tubes just mentioned are rendered conductive. Line 43 is similarly connected to grids of the tubes 33 and 34.

The line 16c from the amplifier 15c is connected to the control grids of both the tubes 31 and 34. Line 16c is similarly connected to the control grids of tubes 32 and 35, and line 16v to the control grids of tubes 33 and 36. The screens of all the pentode tubes are shown connected to a common line 46, which in turn is connected by line 47 to a source of screen voltage.

All of the cathodes and the suppressers can be connected to ground through a biasing resistor 48. Also the screens can be grounded through condensers as illustrated.

With the arrangement described above the pulse generator 39 is operated in synchronism with the horizontal sweep frequency of the cathode ray tube, and also with the vertical deflecting frequency. Assuming that while one line of the screen is being scanned, a pulse is supplied by line 41, as the beam starts its next sweep in a horizontal direction, the pulse applied to line 41 is discontinued and a pulse is applied to line 42. Similarly when the sweep of the next line is commenced the pulse applied to line 42 is discontinued, and a voltage pulse is applied to line 43. Similarly when the sweep of the next line is commenced the pulse applied to line 42 is discontinued, and a voltage pulse is applied to line 43. By way of example and with the resister 48 providing a bias of about 3 volts, the pulses may provide a voltage of −30 for the non-conducting period, and zero voltage for the conducting period.

The synchronized voltage pulses applied from the generator 39 serve to cause the tubes of the electronic switching network to be conducting or non-conducting, and to repeat and amplify the pulses from the amplifiers 15c, 15g and 15v. Thus for an interval when a pulse supplies zero voltage to line 41, tubes 31 and 35 are rendered conducting, and therefore lines 16c and 16g are effectively placed in conductive relation with lines 18 and 19, whereas line 16v is in non-conductive relation with respect to both lines 18 and 19. Similarly when a pulse applies zero voltage to line 42, with −30 volts supplied to lines 41 and 43, tubes 32 and 36 are rendered conductive, and thus lines 16g and 16v are placed in conductive relation with the lines 18 and 19, while line 16c is in non-conductive relation with respect to both lines 18 and 19. In the same manner a zero voltage applied to line 43 serves to make tubes 33 and 34 conductive, whereby lines 16v and 16c are placed in conductive relation with the lines 18 and 19.

Operation of my system as a whole can now be described as follows: Assuming that the beam scans the lines of the screen successively, the order will be crimson, green, violet, crimson, green, violet, etc. Assuming that a green phosphor line is being scanned, and that the beam properly tracks upon the line, there is substantially no light from the adjacent lines 11c and 11v, and therefore no substantial amount of violet and crimson light will be received by the photoelectric tubes 13c and 13v. If however the beam should deviate upwardly or downwardly from proper tracking relation, a part of the beam will impinge upon the adjacent line. Assuming that the beam tracks upon a part of the line 11c, a crimson light is received by the photoelectric tube 13c, and the response thus obtained produces an amplified response from amplifier 13c, to act upon the electronic switching network 17. By virtue of the sequential conditioning of the switching network, the line 13c is placed in conductive relation with line 18, and the resultant current flow through the coil 23 produces a downward force component upon the beam tending to depress it into proper tracking relation.

In actual practice, and assuming about 100 lines per inch, the range deflection by current flow through the supplemental coils 23 and 24 may be of the order of from 0 to 0.05 inch. Supplemental deflection within this range is ample to maintain accurate tracking of the beam upon the individual phosphor lines.

In the foregoing it is assumed that the phosphor lines are scanned in the regular order in which they appear upon the screen. Other types of scanning can be used however, as for example what can be termed line color interlace. Thus assuming that the lines appear in the order of crimson, green, violet, crimson, green, violet, crimson, green, violet, etc., the color sequence in scanning can be crimson, violet, green, crimson, violet, green, crimson, violet, green, etc. Assuming 100 lines per inch, such a scanning system would provide 750 lines per complete picture. Also the scanning sequence can be crimson, green, violet, crimson, green, violet, etc., making use of the first crimson, the second green, the third violet, the fifth crimson, the sixth green, the seventh violet, the ninth crimson, etc. This system would provide 375 lines per complete picture.

Another type of scanning which can be termed frame color interlace can be used. In this type of scanning the crimson lines can be successively scanned to give one complete picture frame, and then consecutively the green and violet lines. Such a sequence provides the same number of frames and lines per frame as conventional black and white television.

By a simple modification of my system it is suitable for the reception of black and white images. For this purpose it is only necessary to increase the effective size of the cathode ray beam until it simultaneously tracks upon three adjacent phosphor lines to reproduce all three colors simultaneously, thus producing the effect of white light. At the same time the photoelectric tubes and their connected circuits are disabled.

It will be evident from the foregoing that I have provided a color television receiving system which is capable of reproducing images in color to a high degree of accuracy and uniformity. Whereas tracking of the narrow phosphor lines would be difficult if not impossible by conventional tracking circuits, with my system such accurate tracking is made possible by the use of automatic means, which is operated responsive to any tendency of the beam to depart from accurate tracking. My system is also relatively flexible in the manner in which it can be applied in practice, making possible variation in the number of lines per picture, and permitting conventional black and white as well as color reproduction.

I claim:

1. In a color television receiving system, a cathode ray tube having a screen provided with color phosphors distributed in parallel lines, circuit means connected to the tube for sweeping the beam of the tube in the direction of said lines, circuit means connected with said tube for cyclically deflecting the beam in a direction laterally of said lines, to thereby track the beam successively over lines of the screen which have phosphors of different color, and means responsive to light from screen lines closely adjacent the opposite side of the line being tracked for modifying the deflection of the beam to correct for tracking inaccuracy, said last means including a plurality of photoelectric tubes, one tube being responsive to light from a screen line closely adjacent the line being tracked and another tube being responsive to light from a screen line adjacent the other side of the line being tracked, electronic means for deriving currents dependent in value upon light excitation of said photoelectric tubes, and means for utilizing such currents to correct for tracking inaccuracy, said last means including supplemental electromagnetic deflecting coils associated with the tube and to which said currents are applied.

2. In a color television receiving system, a cathode ray tube having a screen provided with color phosphors distributed in parallel lines, circuit means connected to the tube for cyclically sweeping the beam of the tube in the direction of said lines, circuit means connected with said tube for deflecting the beam in a direction laterally of said lines to thereby cause the beam to track successively over lines of the screen which have phosphors of different color, and supplemental means responsive to light from screen lines closely adjacent the line being tracked for modifying the deflection of the beam to correct for tracking inaccuracy, said last means comprising two photoelectric tubes, one tube being selectively responsive to light from a screen line adjacent one side of the line being tracked and the other tube being selectively responsive to light from a screen line on the other side of the line being tracked, means for amplifying the responses of said photoelectric tubes, electromagnetic deflector coils associated with the tube and independent of said circuit means for cyclically deflecting the beam in a direction laterally of the lines, and electronic switching means responsive to the output of said amplifying means for selectively supplying correcting currents to said coils, to thereby maintain accurate tracking of the beam on the individual lines.

JACOB H. WIENS.

References Cited in the file of this patent

UNITED STATES PATENTS

| Number | Name | Date |
|---|---|---|
| 2,415,059 | Zworykin | Jan. 28, 1947 |
| 2,490,812 | Huffman | Dec. 13, 1949 |
| 2,530,431 | Huffman | Nov. 21, 1950 |
| 2,545,325 | Weimer | Mar. 13, 1951 |